United States Patent [19]

Maemura

[11] Patent Number: 5,585,941
[45] Date of Patent: Dec. 17, 1996

[54] FACSIMILE MACHINE HAVING IMAGE MEMORY

[75] Inventor: Koichiro Maemura, Isehara, Japan

[73] Assignee: Ricoh Company, Ltd., Tokyo, Japan

[21] Appl. No.: 462,316

[22] Filed: Jun. 5, 1995

Related U.S. Application Data

[63] Continuation of Ser. No. 265,634, Jun. 24, 1994, abandoned, which is a continuation of Ser. No. 43,992, Apr. 7, 1993, abandoned, which is a continuation of Ser. No. 638,340, Jan. 7, 1991, abandoned.

[30] Foreign Application Priority Data

Jan. 8, 1990 [JP] Japan ............................... 2-2037

[51] Int. Cl.$^6$ ........................................ H04N 1/40
[52] U.S. Cl. .................. 358/444; 358/404; 358/407; 358/437
[58] Field of Search .................. 358/404, 405, 358/406, 437, 444, 407

[56] References Cited

U.S. PATENT DOCUMENTS

| | | | |
|---|---|---|---|
| 4,438,459 | 3/1984 | Levine | 358/406 |
| 4,571,069 | 2/1986 | Kimura et al. | 355/14 R |
| 4,581,656 | 4/1986 | Wada | 358/437 |
| 4,630,198 | 12/1986 | I-Yuan | 364/200 |
| 4,841,373 | 6/1989 | Asami et al. | 358/404 |
| 4,907,094 | 3/1990 | Mishima | 358/437 |
| 4,920,427 | 4/1990 | Hirata | 358/437 |
| 4,965,613 | 10/1990 | Morris et al. | 355/208 |
| 5,032,929 | 7/1991 | Asano et al. | 358/404 |
| 5,050,004 | 9/1991 | Morton, Jr. | 358/405 |
| 5,055,935 | 10/1991 | Ohno | 358/444 |
| 5,081,594 | 1/1992 | Horsley | 395/150 |
| 5,148,286 | 9/1992 | Knodt et al. | 358/468 |
| 5,220,438 | 6/1993 | Yamamoto | 358/404 |
| 5,309,507 | 5/1994 | Hosaka et al. | 358/437 |
| 5,311,327 | 5/1994 | Fukushima et al. | 358/444 |
| 5,321,530 | 6/1994 | Kawaji | 358/404 |
| 5,335,085 | 8/1994 | Nakatsuma | 358/437 |

*Primary Examiner*—Edward L. Coles, Sr.
*Assistant Examiner*—Thomas L. Stoll
*Attorney, Agent, or Firm*—Oblon, Spivak, McClelland, Maier & Neustadt, P.C.

[57] ABSTRACT

A facsimile machine includes: a receiving system for receiving image information; an image memory for storing the image information received by the receiving system; a recording unit for recording the image information stored in the image memory on recording sheets; a detector for detecting first image information which has been recorded by the image recording means when the recording means interrupts the recording of the image information; and a first eraser for erasing the first image information from the image memory means, so that only a second image information which is not yet recorded by the recording means is maintained in the image memory means. And another facsimile machine further includes: a controller for supplying the second image information to the recording means when the recording means resumes recording the image information; and a second eraser for erasing the second image information from the image memory after the second image information has been entirely recorded by the recording unit.

7 Claims, 3 Drawing Sheets

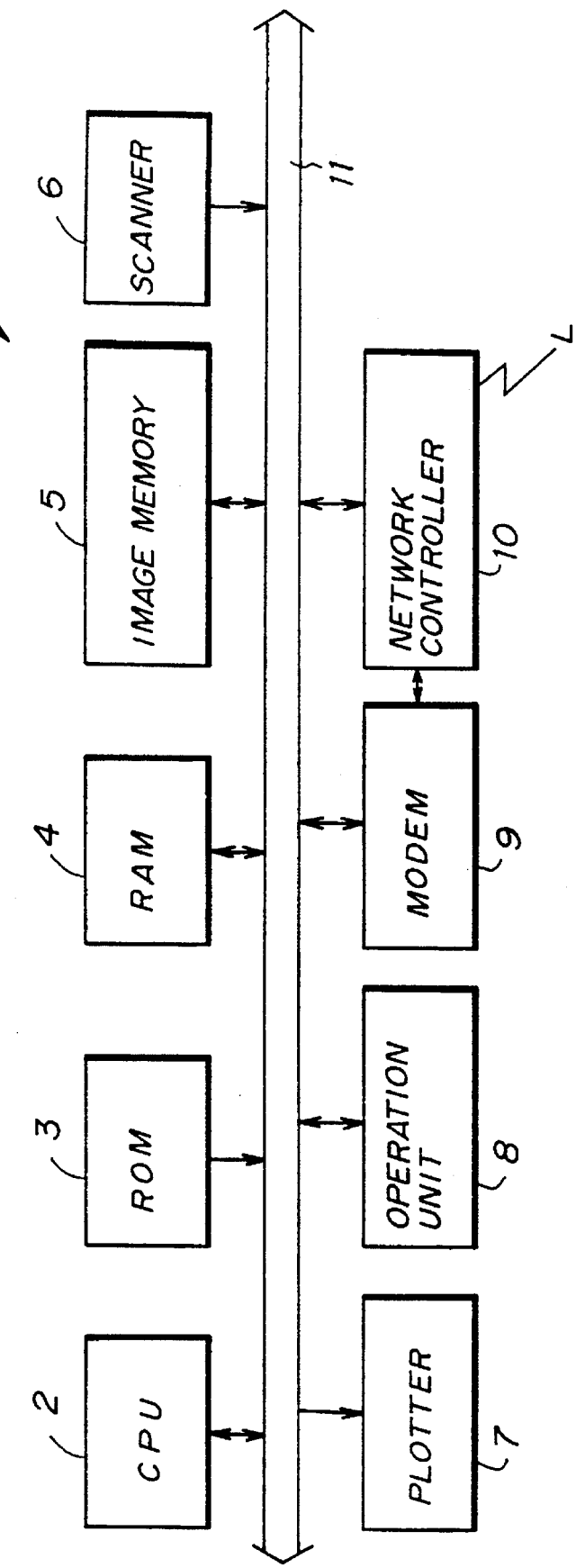

FACSIMILE MACHINE HAVING IMAGE MEMORY

This application is a continuation of application Ser. No. 08/265,634, filed on Jun. 24, 1994, now abandoned, which is a Continuation of application Ser. No. 08/043,992, filed on Apr. 7, 1993, now abandoned, which is a continuation application Ser. No. 07/638,340, filed on Jan. 7, 1991, now abandoned.

BACKGROUND OF THE INVENTION

The present invention generally relates to a facsimile machine, and more particularly to a facsimile machine having an image memory in which the received image information is stored.

Conventionally, a facsimile machine having an image memory in which the received image information is stored has been proposed. In this type of facsimile machine, after the image information from a line is received and the received image information is stored in the image memory, the image information is read out from the image memory and recorded on a recording sheet by a recording unit such as a plotter.

In addition, a facsimile machine having the image memory and a redirection function has been proposed by Japanese Laid-Open Patent Application No. 63-63278. In the redirection function, when the image information is transferred to the facsimile machine and the facsimile machine receives the image information, the facsimile machine redirects the received image information to a predetermined destination.

This facsimile machine operates as follows.

When the image information is received, the received image information is stored in the image memory. After that, the received image information is read out from the image memory and recorded on the recording sheets by the recording unit. When the received image information is entirely recorded on the recording sheet, the received information is read out from the image memory again and redirected to a predetermined destination which has been recorded in a predetermined memory of the facsimile machine. Then, after the redirection of the received image information is completed, the image information stored in the image memory is erased.

In the conventional facsimile machine described above, when the recording unit breaks down while the recording unit records the image information on the recording sheets, the recording of the image information is interrupted. In this case, even if the image information stored in the image memory is redirected to the destination facsimile, the image information stored in the image memory is not erased. Then, when the recording unit is repaired, the recording unit records the image information related to each page 95 stored in the image memory starting with the first page. After the image information related to all pages stored in the image memory is entirely recorded, the image information stored therein is erased.

In the conventional facsimile machine, when the recording unit breaks down while the recording unit records the image information on the recording sheets, the image information related to all pages must be maintained in the image memory in order to entirely record the image information starting from the first page. That is, although the image information related to some pages has been recorded on the recording sheets, the image information related to all pages is maintained in the image memory and the recording unit starts to record the image information related to the first page again when the recording unit is repaired. Therefore, the recording sheets are wasted and the image memory is wastefully used.

SUMMARY OF THE INVENTION

Accordingly, a general object of the present invention is to provide a novel and useful facsimile machine having an image memory in which the disadvantages of the aforementioned prior art are eliminated.

A more specific object of the present invention is to provide a facsimile having an image memory in which it is possible to effectively use the image memory.

The above objects of the present invention are achieved by a facsimile machine comprising: receiving means for receiving image information transferred via a line to the facsimile machine; image memory means for storing the image information received by the receiving means; image recording means, coupled to the image memory means, for reading out the image information from the image memory means and for recording the image information read out from the image memory means on a recording medium; detecting means for detecting first image information which has been recorded by the image recording means when the recording means interrupts the recording of the image information; and first erasing means for erasing the first image information from the image memory means, so that only second image information which is not yet recorded by the recording means is maintained in the image memory means.

Another object of the present invention is to provide a facsimile apparatus having an image memory in which it is possible to prevent the recording sheets from being wasted.

The above objects of the present invention are achieved by the facsimile machine described above further comprising: control means for supplying the second image information maintained in the image memory means to the recording means when the recording means resumes recording the image information, so that the image recording means records the second image information on the recording medium; and second erasing means for erasing the second image information from the image memory means after the second image information has been entirely recorded by the recording means.

Additional objects, features and advantages of the present invention will become apparent from the following detailed description when read in conjunction with the accompanying drawings.

BRIEF DESCRIPTION OF THE DRAWINGS

FIG. 1 is a block diagram illustrating a facsimile machine according to an embodiment of the present invention.

PREFERRED EMBODIMENT OF THE PRESENT INVENTION

Figure 2A:
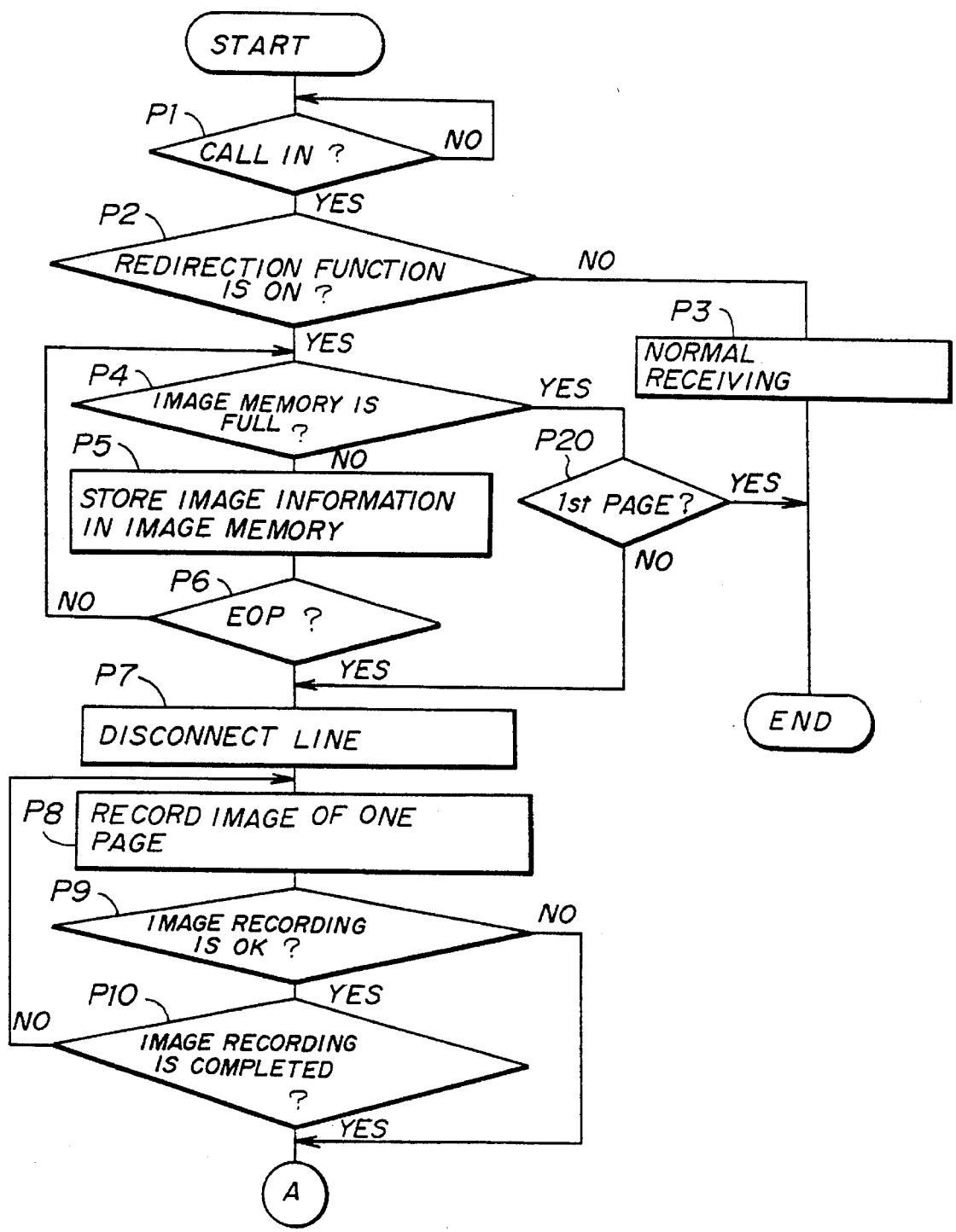
FIGS. 2A and 2B are flow charts illustrating an example of a process performed by the facsimile machine shown in FIG.1.

A description will now be given of an embodiment of the present invention with reference to FIGS. 1, 2A and 2B.

In FIG. 1, which shows the basic structure of the facsimile machine, the facsimile machine 1 has a central processing unit (CPU) 2, a read only memory (ROM) 3, a random access memory (RAM) 4 and an image memory 5. The facsimile machine 1 also has a scanner 6, a plotter 7, an operation unit 8, a modem 9 and a network controller 10. The parts of the facsimile machine 1 described above are connected by a bus 11 to each other.

In the ROM 3, a basic program of the facsimile machine 1 and programs for controlling the image memory and recording the image information are stored. In the RAM 4, a working area is formed and the number of pages of the recording sheets on which the image information has been recorded are stored. The CPU 2 entirely controls the facsimile machine 1 in accordance with the programs stored in the ROM 3, so that the basic operation of the facsimile machine 1 is performed, the image memory is controlled and the image information is recorded on the recording sheets.

The image memory 5 has a capacity which amounts to a predetermined plurality of pages. The image information read by the scanner 6 and the image information which is received by the facsimile 1 are stored in the image memory 5. The scanner 6 has a line sensor such as a CCD (Charge Coupled Device). The scanner 6 scans the document for every line and outputs the image data corresponding to the image for every line on the document. The plotter 7 has a recording device such as a thermal recording device. The thermal recording device directly records the image data on a thermal recording sheet or indirectly records the image data via an ink sheet on a normal recording sheet.

The operation unit 8 has a plurality of numeral keys, operation keys and a display panel such as a liquid crystal display (LCD). An operator inputs various commands via the operation unit 8 to the facsimile machine 1. The destination facsimile to which the image data is redirected is recorded in the facsimile machine 1 by an operation of the operation unit 8. A code of the redirection mode in which the received image is redirected to the destination recorded in the facsimile machine 1 is also input via the operation unit 8 to the facsimile machine 1.

The modem 9 modulates a transmission signal so as to be suitable for a line (L) when the image data is transferred to a destination, and demodulates a modulated signal from the line (L) when the image data (modulated signal) is received. The network controller 10 is connected to the line (L). The network controller 10 performs processes for automatically calling out another party and for being automatically called by another party.

A description will now be given of an operation of the facsimile machine 1 described above with reference to FIGS. 2A and 2B. The process represented by the flow charts shown in FIGS. 2A and 2B are mainly performed in the CPU 2.

When the code of the redirection mode is input via the operation unit 8 to the facsimile machine 1, a redirection flag is turned on.

Referring to FIG. 2A, after a process starts, when step (P1) detects a call in from another party, step (P2) determines whether or not the redirection flag is turned on. When the result obtained in step (P2) is NO, a normal receiving process is performed in step (P3), and then the process is completed. That is, the image information which is transferred from the other party and received by this facsimile machine is recorded on the recording sheets. When the result obtained in step (P2) is YES, step (P4) determines whether or not the image memory 5 is full. When the image memory 5 is not full and the result in step (P4) is NO, the image information which is received by this facsimile machine is stored in the image memory 5 in step (P5). When the image information related to one page is entirely stored in the image memory 5, step (P6) determines whether or not the image information which has been stored in the image memory 5 is image information related to the last page. When the result obtained in step (P6) is NO, the process returns to step (P4), so that step (P4) determines again whether or not the image memory is full. When the image memory 5 is not full, the image information related to the next page is stored in the image memory 5. And then, the process of steps (P4) (P5) and (P6) is repeatedly performed until the image information related to the last page has been stored in the image memory 5.

When the received image information is entirely stored in the image memory 5, the line (L) is disconnected from the facsimile machine 1 in step (P7). And then, the image information stored in the image memory 5 is recorded in accordance with the following process.

The image information related to the first page is read out from the image memory 5 in step 8. The image information related to the first page read out from the image memory 5 is supplied to the plotter 7, and then the plotter 7 records the image information related to the first page on the recording sheet. After that, step (P9) determines whether or not the image information related to the first page is normally recorded on the recording sheet. When the image information of the first page is normally recorded and the result obtained in step (P9) is YES, step (P10) determined whether or not the image information related to all pages has been recorded on the recording sheets. When the image information related to all pages is not yet recorded and the result in step (P10) is NO, the process returns to step (PS) and the image information related to the second page is read out from the image memory 5 and recorded on the next recording sheet. And then, the process of steps (P8) (P9) and (P10) is repeatedly performed until the image information related to the last page has been recorded on the recording sheet.

Figure 2B:
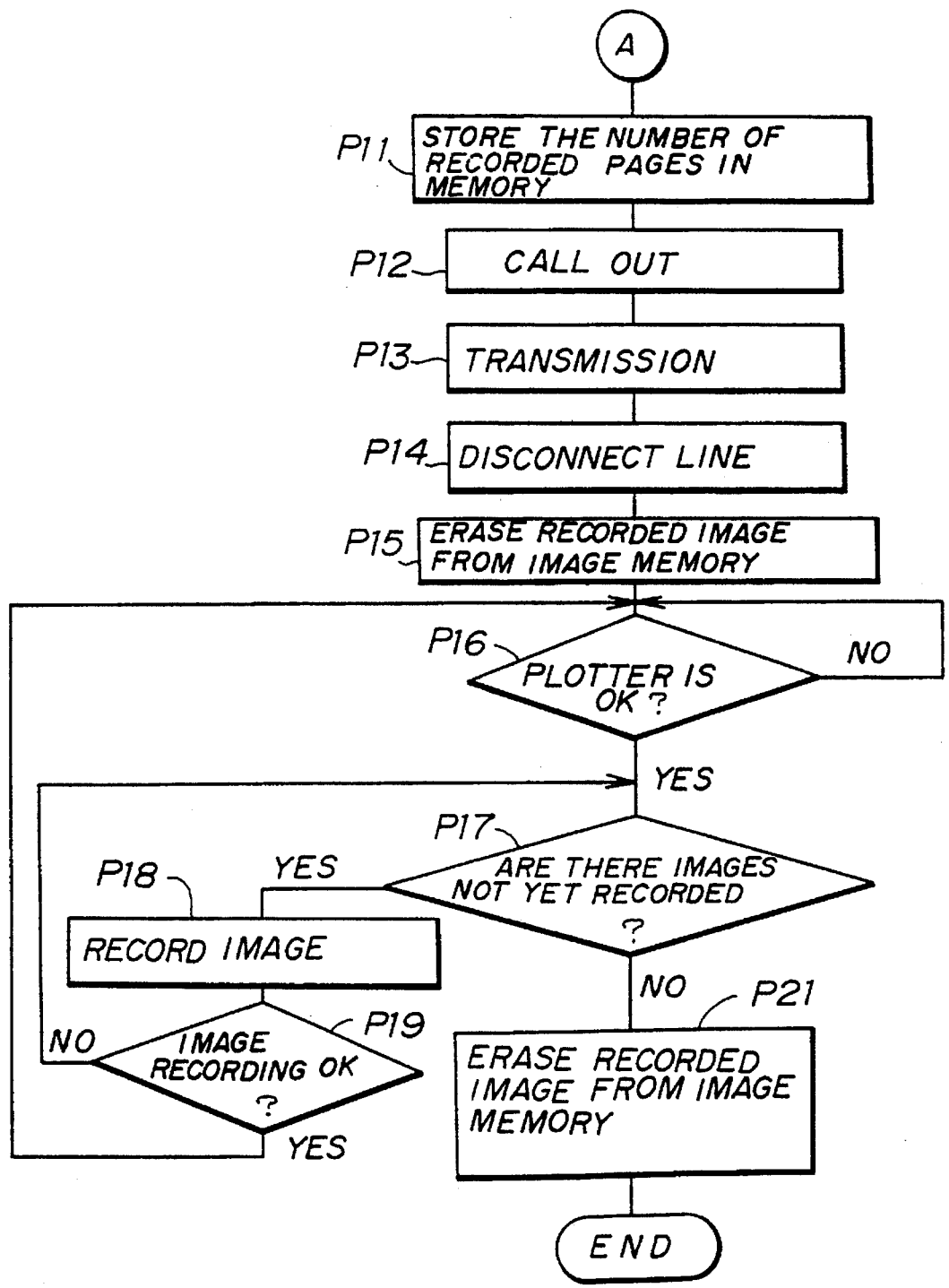

When the image information related to all pages is recorded on the recording sheets and the result in step (P10) is YES, the process proceeds to step (P11) shown in FIG.2B. Also, when the image information is not normally recorded due to the break down of the plotter 7 or the like and the result in step (P9) is NO, the process proceeds to step (P11). In step (P11), the number of pages related to the image information which has been recorded is stored in the RAM 4. For example, in a case where the plotter 7 breaks down when the image information related to four pages of the first page through the fourth page has been recorded on the recording sheets, the number of pages of "4" is stored in the RAM 4.

After that, in order to redirect the image information to the destination which is recorded in the RAM 4, this facsimile machine 1 calls the destination in step (P12). When the destination responds to the calling out of this facsimile machine, the image information is read out from the image memory 5 and transferred to the destination, in step (P13). When the transmission of the image information stored in the image memory 5 is completed, the line (L) is disconnected from this facsimile machine 1, in step (P14). And then the number of pages related to the image information which has been recorded is read out from the RAM 4, and only the image information corresponding to the pages read out from the RAM 4 is erased from the image memory 5, in step (P15). For example, when the number of pages of "4" is stored in the RAM 4, the image information related to the first page through the fourth page is erased from the image memory, and the image information related to each page on and after fifth page is maintained in the image memory 5.

After that, step (P16) determines whether or not the plotter 7 is normal. When the plotter 7 is repaired so as to become normal and the result in step (P16) is YES, step (P17) determines whether or not there is the image information, which is not yet recorded on the sheets, in the image memory 5. When there is no image information in the image memory 5 and the result in step (P17) is NO, the process is completed since the image information is entirely recorded on the recording sheets. When there is the image information in the image memory 5 and the result in step (P17) is YES, the image information stored in the image memory 5 is recorded on the recording sheets in step (P18) and step (P19) determines whether or not the image information related to a page is normally recorded on the recording sheet. When the image information related to the page is normally recorded and the result in step (P19) is YES, the image information related to the next page is recorded on the recording sheet. And then the process of step (P17) (P18) and (P19) is repeatedly performed until the recording of the entire image information stored in the image memory 5 is completed. When the image information stored in the image memory 5 is completed, the image information stored in the image memory 5 is erased in step (P21) and then the process is completed.

When a trouble is generated in the plotter 7 while the image information is recorded in accordance with the process of steps (P17) (P18) and (P19), the process returns to step (P16) for determining whether or not the plotter 7 is normal. And then, the process in the same manner as that described above is performed until the image information stored in the image memory 5 is entirely recorded on the recording sheets.

On the other hand, in a case where this facsimile machine 1 receives the image information, when the image memory is full and the result in step (P4) shown in FIG.2A is YES, step (P20) determines whether or not the received image information is an image information related to the first page. When the result in step (P20) is YES, the image information can not be received, so that the process is completed. When the result in step (P20) is No, the process proceeds to step (P7), so that the line (L) is disconnected from the facsimile machine.

According to the present invention, when the trouble is generated in the recording unit while the recording unit records the image information stored in the image memory, only the image information which has been recorded is erased from the image memory and the image information which is not yet recorded is maintained in the image memory. Then, when the recording unit is repaired, only the image information which has not been yet recorded is recorded on new recording sheets. Therefore, the image memory can be effectively used and it is possible to prevent the recording sheets from being wasted.

The present invention can be also applied to a facsimile machine without a redirection function.

The present invention is not limited to the aforementioned embodiments, and variations and modifications may be made without departing from the scope of the claimed invention.

What is claimed is:

1. A facsimile machine comprising:

receiving means for receiving image information of a document transferred via a line to said facsimile machine;

image memory means for storing said image information received by said receiving means;

image recording means, coupled to said image memory means, for reading out said image information from said image memory means and for recording said image information read out from said image memory means on a recording medium;

detecting means for detecting first image information, which corresponds to one or more pages of said document, and which has been normally recorded by said image recording means when said recording means interrupts the recording of the image information;

destination memory means for storing a predetermined destination;

redirection means for redirecting the first image information which has been normally recorded and which is stored in said image memory means to said predetermined destination stored in said destination memory means; and first erasing means for erasing said first image information detected by said detecting means from said image memory means, so that only second image information, which corresponds to one or more pages of said document, and which is not yet recorded by said recording means and which is not yet redirected to said predetermined destination is maintained in said image memory means.

2. A facsimile machine as claimed in claim 1, wherein said image recording means records the image information related to each page on a recording sheet, and wherein said detecting means has a storage means for storing the number of pages related to the first image information detected by said detecting means, said first erasing means erasing the image information from said memory means on the basis of the number of pages stored in said storage means so that the first image information detected by said detecting means is erased from said image memory means.

3. A facsimile machine as claimed in claim 1 further comprising:

control means for supplying said second image information maintained in said image memory means to said recording means when said recording means resumes recording the image information, so that the image recording means records said second image information on said recording medium; and second erasing means for erasing said second image information from said image memory means after said second image information has been entirely recorded by said recording means.

4. A facsimile machine comprising:

receiving means for receiving image information of a document transferred via a line to said facsimile machine;

image memory means for storing said image information of said document received by said receiving means;

image recording means, coupled to said image memory means, for reading out said image information of said document from said image memory means and for recording said image information of said document read out from said image memory means on a recording medium;

determining means for determining whether or not said image recording means is normally recording said image information of said document on said recording medium;

detecting means for detecting a first portion corresponding to one or more pages of said image information of said document which has been normally recorded by said image recording means when the recording of the image information of said document is interrupted due to a determination result of said determining means which signifies that said recording means is not normally recording said image information of said document;

destination memory means for storing a predetermined destination;

redirection means for redirecting the first image information which has been normally recorded and which is stored in said image memory means to said predetermined destination stored in said destination memory means; and first erasing means for erasing, from said image memory means, said first portion of said image information of said document detected by said detecting means prior to resumption of normal recording by the recording means, so that only a second portion corresponding to one or more pages of said image information of said document which has not yet been recorded by said recording means and which is not yet redirected to said predetermined destination is maintained in said memory means, and wherein only said second portion of said image information is output from said image memory means to said recording means upon said resumption of normal recording by said recording means.

5. A facsimile machine as claimed in claim 4, wherein said determining means determines whether or not said recording means is normally recording the image information of said document corresponding to each of a plurality of pages onto said recording medium.

6. A facsimile machine as claimed in claim further comprising:

control means for supplying said second portion of said image information maintained in said image memory means to said recording means when said recording means resumes recording the image information of said document, so that the image recording means records said second portion of said image information on said recording medium; and second erasing means for erasing said second portion of said image information from said image memory means after said second portion of said image information has been entirely recorded by said recording means, wherein said determining means determines whether or not said recording means is normally recording the image information of said document corresponding to each of a plurality of pages onto said recording medium, and wherein a control means supplies said second portion of said image information starting from a page at which it is determined by said determining means that the recording means was interrupted.

7. A facsimile machine comprising:

receiving means for receiving image information of a document transferred via a line to said facsimile machine;

image memory means for storing said image information of said document received by said receiving means;

image recording means, coupled to said image memory means, for reading out said image information of said document from said image memory means and for recording said image information of said document read out from said image memory means onto a recording medium;

determining means for determining whether or not said image recording means is normally recording said image information of said document onto said recording medium;

detecting means for detecting a first portion corresponding to one or more pages of said image information of said document which has been normally recorded by said image recording means when the recording of the image information of said document is interrupted due to a determination result by said determining means which signifies that said recording means is not normally recording said image information of said document;

first erasing means for erasing, from said image memory means, said first portion of said image information of said document detected by said detecting means prior to a resumption of normal recording by the recording means; and redirection transferring means for redirecting said image information of said document to a destination facsimile, wherein upon said determination result by said determining means that said recording means is not normally recording said image information of said document, said redirection transferring means redirects said first portion of said image information of said document stored in said image memory means which has normally recorded to said destination facsimile and upon completion of said redirecting of all of said first portion of said image information of said document to said destination facsimile, said first erasing means erases said first portion of said image information from said image memory means so that only a second portion corresponding to one or more pages of said image information of said document which has not yet been recorded by said recording means and which has not yet been redirected to said destination facsimile is maintained in said image memory means, and wherein only said second portion of said image information is output from said image memory means to said recording means upon resumption of normal recording by said recording means.

\* \* \* \* \*